United States Patent Office 3,663,628
Patented May 16, 1972

3,663,628
CATALYSTS FOR PRODUCING ACETYLENIC
ALCOHOLS
Robert J. Tedeschi, Whitehouse Station, N.J., assignor to
Air Products and Chemicals, Inc., Allentown, Pa.
No Drawing. Continuation of application Ser. No.
845,623, July 3, 1969, which is a continuation of
application Ser. No. 661,171, Aug. 14, 1967, which
in turn is a continuation of application Ser. No.
352,955, Mar. 18, 1964. This application July 6,
1970, Ser. No. 56,130
Int. Cl. C07c 33/04, 35/08, 33/06
U.S. Cl. 260—632 Y                        9 Claims

ABSTRACT OF THE DISCLOSURE

Acetylenic alcohols, of a type produced by the reaction of a ketone and acetylene, are reacted with an alkali metal hydroxide to produce adducts which have utility as catalysts for the synthesis of acetylenic alcohols. The reaction of the alcohol and the hydroxide takes place in the presence of a solvent, following which the adduct is separated from the solvent.

CROSS REFERENCE TO RELATED APPLICATIONS

This application is a continuation of application S.N. 845,623 filed July 3, 1969 and now abandoned; which, in turn, was a continuation of application S.N. 661,171 filed Aug. 14, 1967 and now abandoned; which, in turn, was a continuation of application S.N. 352,955 filed Mar. 18, 1964 and now abandoned.

This invention relates to the preparation of hydroxyacetylenic compounds and is more particularly concerned with the preparation of acetylenic carbinols by a process involving the reaction of an acetylenic hydrocarbon with a carbonyl compound in the presence of a catalyst.

It has been heretofore proposed that acetylenic alcohols be prepared by the so-called Favorsky reaction by inter-reacting acetylene and a carbonyl compound in the presence of potassium hydroxide and in the presence of a reaction medium. Various solvents, such as ethers and polyethers, have been suggested as media in which this reaction may be conducted. However, such prior operations have not proved entirely satisfactory in the past and a chief disadvantage of such prior processes has been the need to use at least stoichiometric amounts of potassium hydroxide, i.e. amounts of potassium hydroxide which were at least equimolecular, and generally significantly greater than equimolecular, with respect to the amount of acetylenic alcohol formed. In other words, the combination of potassium hydroxide and the reaction media heretofore used in these prior processes had only limited activity with respect to effecting reaction between the acetylene and the carbonyl compound. The use of large amounts of potassium hydroxide is non-economic, and requires the recovery and processing of potassium hydroxide so that it may be reused. Therefore, the economics of these prior processes are dependent, in large measure, upon the capital investment necessary to process potassium hydroxide and the amount of potassium hydroxide required in the process.

In Tedeschi et al. U.S. Pat. 3,082,260 there is disclosed a process for producing acetylenic alcohols with only catalytic quantities of alkali metal hydroxides by carrying out the reaction in liquid ammonia.

It is an object of the present invention to provide another catalytic process for preparing acetylenic alcohols.

In accordance with the present invention, it has been found that acetylenic alcohols can be efficiently, and economically prepared from an acetylenic hydrocarbon and a carbonyl compound using only small or catalytic, i.e. substantially less than equimolecular amounts, of an adduct or complex of an alkali metal hydroxide, selected from the group consisting of sodium hydroxide, potassium hydroxide, cesium hydroxide and rubidium hydroxide, and an acetylenic alcohol in which the alkali metal hydroxide and the acetylenic alcohol are in a 1:1 molar ratio. While the reaction between the acetylenic compound and the carbonyl compound in the presence of the adduct catalyst is preferably carried out in liquid ammonia, it can also be carried out in other polar solvents such as diisopropyl ether, dioxane, methylal, ethylenediamine, dimethyl sulfoxide, and the like. When the reaction is carried out in liquid ammonia, it is conducted under a pressure above atmospheric pressure and at a temperature of at least —10° C. When the reaction is conducted in other polar solvents, it can be carried out at atmospheric pressure and at temperatures of 20° C. to 40° C. Generally speaking, the process is suitably carried out at temperatures of —10° C. to 60° C. and at pressures from atmospheric up to 800 p.s.i.g.

The preferred acetylenic hydrocarbon for use in the invention is acetylene and in the following description of the invention reference will be made to acetylene. However, it is to be understood that other acetylenic hydrocarbons can be employed in the practice of the invention to make acetylenic alcohols. Thus, in general, there may be employed, as the acetylenic hydrocarbon a compound of the formula R—C≡C—H, wherein R is hydrogen or a hydrocarbon radical such as alkyl, alkenyl, alkynyl, cycloalkyl, aryl and alkaryl. Preferably, when R is a hydrocarbon radical, R contains 1 to 10 carbon atoms such as an alkyl radical containing 1 to 10 carbon atoms, an alkenyl radical containing 2 to 10 carbon atoms, a cycloalkyl radical containing 6 to 10 carbon atoms, an aryl radical containing 6 to 10 carbon atoms, or an aralkyl radical containing 7 to 10 carbon atoms. Specific examples of acetylenic hydrocarbons other than acetylene itself which may be used in preparing acetylenic alcohols in accordance with this invention are methyl acetylene, ethyl acetylene, propyl acetylene, hexyl acetylene and like alkyl acetylenes, vinyl acetylene, isopropenyl acetylene and like alkenyl acetylenes, diacetylene and like alkynylacetylenes, cyclohexyl acetylene, methylcyclohexyl acetylene and like cycloalkyl acetylenes, phenyl acetylene, tolyl acetylene, xylyl acetylene and like aryl acetylenes, and benzyl acetylene, phenylethyl acetylene, methylbenzyl acetylene and like alkaryl acetylenes.

While any carbonyl compound may be reacted with an acetylenic hydrocarbon in accordance with the present invention to prepare in acetylenic alcohol, those carbonyl compounds are preferred which may be represented by the following general formula:

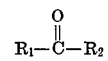

wherein $R_1$ and $R_2$ may be the same or different radicals selected from the group consisting of hydrogen; alkyl such as methyl, ethyl, propyl, butyl, isopropyl, iso-butyl, tertiary butyl, hexyl, and like alkyl groups containing from 1 to 20 carbon atoms; cycloalkyl such as cyclopropyl, cyclohexyl, and like cycloalkyl groups containing 3 to 10 carbon atoms; aryl such as phenyl, xylyl, tolyl, and like aryl groups containing 6 to 12 carbon atoms; hydroxyalkyl such as hydroxymethyl, hydroxyethyl, and like groups containing 1 to 20 carbon atoms; hydroxycycloalkyl such as hydroxycyclohexyl (HO—$C_6H_{10}$—), and like group containing 3 to 10 carbon atoms; alkoxyalkyl such as methoxymethyl ($CH_3$—O—$CH_2$—), methoxyethyl ($CH_3$—O—$C_2H_4$—), ethoxybutyl ($C_2H_5$—O—$C_4H_8$—), and like groups containing 2 to 20 carbon atoms; and alkoxycycloalkyl such as methoxycyclohexyl $(CH_3—O—C_6H_{10}—)$ propoxycyclopentyl $(C_3H_7—O—C_5H_8)$, and groups containing 4 to 20 carbon atoms. $R_1$ and $R_2$ may also be joined to form a cycloalkyl ring. Thus taken together, $R_1$ and $R_2$ may form a cycloalkyl radical containing 6 to 12 carbon atoms. In the compounds corresponding to the above formula, which are aldehydes or ketones, preferably at least one of $R_1$ and $R_2$ is not an aryl radical although carbonyl compounds in which both $R_1$ and $R_2$ are aryl groups, such as benzophenone are suitably used. Superior conversions, yields, and rates of reaction are obtainable with these preferred carbonyl compounds. In addition, it has also been found that as the carbon atoms in the radicals represented by $R_1$ and $R_2$ in the foregoing formula increase, the rate of reaction decreases. However, if either $R_1$ or $R_2$ represents methyl or ethyl, the remaining radical $R_1$ or $R_2$ may represent an organic radical of rather long chain length (e.g. $C_{19}$ or higher) without materially decreasing the rate of reaction. Thus, suitable carbonyl compounds include acetone, acetaldehyde, cyclohexanone, propionaldehyde, methylethylketone butyraldehyde, isobutyraldehyde, methylisobutyketone, acetophenone, 2-methyl-2-hydroxy-3-butanone, diethylketone, diisobutylketone, diisopropylketone, ethylbutylketone, methylhexylketone, ethylhexylketone, methylcyclopropylketone, ethylamylketone, methylamylketone, isooctylaldehyde, and other commercially available aldehydes and ketones.

The alkali metal hydroxide adduct employed is preferably an adduct of the acetylenic alcohol which it is desired to produce. However, one of the features of the invention is that the acetylenic alcohol in the adduct used as catalyst can be other than the acetylenic alcohol being produced. Thus an adduct of an acetylenic glycol can be used as a catalyst in the preparation of an acetylenic carbinol.

Generally, the product acetylenic alcohol is prepared by introducing a predetermined amount of the acetylenic hydrocarbon, e.g. acetylene, into a predetermined amount of the solvent, e.g. liquid ammonia, suspending or otherwise dispersing the catalyst in the solvent to form a slurry, and then adding the carbonyl compound. The acetylene and carbonyl compound can also be added simultaneously to the catalyst-solvent slurry. In a less preferred operating procedure, the carbonyl compound and the catalyst can be dispersed in the solvent and acetylene then added. Advantageously, the reaction zone is freed from air before the liquid ammonia, acetylene and carbonyl compound are introduced. This is suitably effected by sweeping the reaction zone with an inert gas, such as nitrogen. After the reaction is completed, excess acetylene, and liquid ammonia, when used as the solvent, are vented and removed, and the reaction mixture is hydrolyzed in the presence of an inert organic solvent, and the acetylenic alcohol obtained is separated. Any inert organic solvent may be used for this purpose, but preferably the same solvent that is employed as the reaction medium is also employed for this purpose, except when the reaction medium is liquid ammonia. In the latter case, the solvent added for hydrolysis is preferably a lower alkyl ether, i.e. an ether of the formula $R_3—O—R_4$ wherein $R_3$ and $R_4$ are the same or different alkyl radicals of 1–6 carbon atoms, such as diethyl ether, methyl ethyl ether, diisopropyl ether, and the like. Hydrolysis of the reaction mixture is readily accomplished by adding water to it, separating the water layer from the organic layer and then treating the layer or layers containing the acetylenic alcohol by carbonation with carbon dioxide, by acidification with a dilute mineral acid, such as, dilute sulfuric acid or hydrochloric acid, by means of ion exchange resins, acid salts or any of the other techniques well known in the art. Thus, in the case of water-soluble acetylenic alcohols, the water layer is treated and in the case of non-water-soluble acetylenic alcohols, the water layer is treated and in the case of non-water-soluble acetylenic alcohols the organic layer is treated. In some cases, both may be treated alternatively. When ammonia is used as the reaction medium, the reaction mixture can be treated directly with carbon dioxide after removal of ammonia without previous addition of water. The method by which the acetylenic alcohol is finally recovered will depend, primarily, upon the physical nature of the reaction mixture, and, generally, will involve either extraction, e.g. with a solvent, or filtration and distillation. The reaction may be run batchwise or continuously.

Operation in accordance with the present invention is to be distinguished from the reaction between a carbonyl and acetylene with the addition of an acetylide. At least equimolecular quantities of the acetylide are used in such operations.

At the same time, the process of this invention is to be distinguished from processes employing the usual organic solvents used in reacting acetylene with a carbonyl compound, such as ethers, e.g. diethyl ether and diisopropyl ether, when an alkali metal hydroxide alone is used. Even when such organic solvents are employed at gage pressures and at temperatures substantially above 0° C., more than equimolecular quantities of alkali metal hydroxide, based upon the acetylenic alcohol, must be employed and hydroxides such as sodium hydroxide are not effective in providing satisfactory conversions to the desired acetylenic alcohol. Generally 2 to 3 times the equimolecular quantity of the alkali metal hydroxide are required under such conditions. Thus, in accordance with the process of the present invention, reaction is carried out at a temperature of −10° C. to 60° C. and when liquid ammonia is used as the solvent, at a pressure of 25 to 800 pounds per square inch gage (p.s.i.g.), the pressure being greater the higher the temperature. Preferably, the temperature is at least 0° and for liquid ammonia, the pressure at least about 45 p.s.i.g. and particularly advantageous results from the standpoint of high catalytic conversions and conversions of carbonyl compound are obtained, using liquid ammonia as the solvent, at a temperature of 20° C. to 40° C. and at a pressure of 100 to 400 p.s.i.g.

The pressures referred to above are total pressures and represent ammonia pressure and the pressure of acetylenic compound to be reacted. In general, the pressure of the ammonia is 110 to 200 p.s.i.g. and the pressure of the acetylenic hydrocarbon, e.g. acetylene, is 150 to 200 p.s.i.g.

The reaction is suitably carried out in any reaction vessel adapted to be operated under gage pressure, such as an autoclave suitably jacketed for temperature control and provided with an agitator, and the components of the reaction mixture are introduced by the use of conventional supply means, such as cylinders or tanks. The amounts charged to the autoclave are advantageously determined by the use of conventional gauging or measuring devices such as scales.

The catalysts of this invention are most readily prepared by bringing the acetylenic alcohol and the alkali metal hydroxide together in a solvent inert to the alcohol, e.g. the solvents mentioned above. However, it has been found that the reactivity of the alkali metal hydroxide and the acetylenic alcohol varies in different solvents, depending upon the nature of the alkali metal hydroxide. Thus, potassium hydroxide and rubidium hydroxide react readily with the acetylenic alcohol in essentially all solvents, whereas cesium hydroxide reacts more difficultly with the acetylenic alcohol in solvents such as isopropyl ether, and there is essentially no reaction between the sodium hydroxide and acetylenic alcohol in this latter solvent. Both of these last-mentioned alkali metal hydroxides react well with acetylenic alcohols in liquid ammonia and thus liquid ammonia is the preferred reaction medium for forming the adducts. The selectivity of the reaction is evident from the fact that lithium hydroxide has not been found to form an adduct with acetylenic alcohols in any of the usual solvents, including liquid ammonia.

Thus, for example, the heterogeneous reaction of essentially anhydrous, finely divided potassium hydroxide with either 3-methyl-1-butyn-3-ol (I) or 2,5-dimethyl-3-hexyn-2,5-diol (II) takes place rapidly and in high conversion in inert solvents under mild reaction conditions.

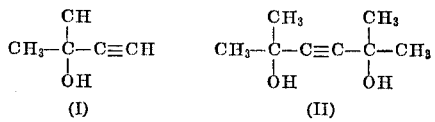

The addition of I or II to a well-stirred stoichiometric amount of finely-divided potassium hydroxide in dry inert solvents such as diisopropyl ether or toluene under anhydrous conditions results in the rapid formation of a thick, white reaction mass. Highly crystalline 1:1 molar adducts of either I or II and potassium hydroxide can be readily isolated under anhydrous conditions in conversions of 98–100%. The resulting reactions proceed rapidly in organic solvents at temperatures as low as −30° and are not significantly exothermic. Potassium hydroxide adducts of I and II also form rapidly (15–30 minutes) in quantitative conversion in liquid ammonia at temperatures of −50° to −60°.

The potassium hydroxide-methyl butynol adduct can also be formed, but less suitably, by introducing acetylene into a mixture of finely-ground potassium hydroxide in isopropyl ether at −10 to 0° until the solvent is saturated with acetylene, and then adding a stoichiometric amount of acetone.

The adducts are readily separated by simple filtration or centrifuging, either in essentially pure form where the conversion is essentially 100% based on the alkali metal hydroxide, or in admixture with some alkali metal hydroxide where less than substantially 100% conversion has been realized. The invention contemplates the use both of the adduct alone and in admixture with the corresponding alkali metal hydroxide, although in the latter case, to obtain the benefits of the invention, the adducts should represent at least about 50% of the combined adduct and alkali metal hydroxide employed.

When liquid ammonia is used as the solvent for the formation of the adducts of the invention, reaction is advantageously carried out at temperatures of −50° to +40° C., and under appropriate pressures of 0 to 400 p.s.i.g. When other solvents are used, temperatures of −30 to +40° C. are suitably employed. It will be apparent that heating of the solvent is not necessary to cause the reaction to proceed.

The adducts are white crystalline solids of good stability. Analyses indicate that the adducts are complexes in which both the tertiary hydroxyl group and the ethynyl group are bound to the alkali metal hydroxide, rather than a tertiary alkoxide containing water of hydration. The adducts can be used in the freshly prepared condition or after several months storage at 0–5° with equal effectiveness.

The dry methyl butynol-potassium hydroxide adduct has been observed to undergo a gradual solid phase transformation into the corresponding acetylenic diol (2,5-dimethyl - 3 - hexyn-2,5-diol)-potassium hydroxide adduct. This latter adduct can also be readily formed in essentially quantitative conversion by simply reacting the diol and powdered potassium hydroxide in toluene or isopropyl ether at 30–35°. Although the 2,5-dimethyl-3-hexyn-2,5-diol-KOH adduct is not formed to any significant extent in catalytic ethynylation, as evidenced by the very low conversions to diol obtained in liquid ammonia or dimethyl sulfoxide, the diol adduct functions as an efficient ethynylation catalyst for acetylenic alcohol formation.

The following specific examples illustrate the preparation of the adduct catalyst of this invention:

EXAMPLE 1

Adducts of acetylenic carbinols and alkali metal hydroxides, such as 3-methyl-1-butyn-3-ol-alkali metal hydroxide adducts, are advantageously prepared by the following general method which can be used for potassium, cesium, and rubidium hydroxides. The alkali hydroxide is first reduced to a coarse powder in a drybox at 0% relative humidity (desiccants—anhydrous molecular sieves and granular calcium carbide) and stored until used. The required amount of alkali hydroxide is then ground in situ in anhydrous solvents (250 cc.), such as diisopropyl ether or toluene, using a stainless steel Waring Blender equipped with a gasketed screw cap top. Solvents boiling lower than 60° are best not employed due to leakage of the blender seals caused by the heat of grinding and resultant pressure increase in the system. Grinding should not be carried out longer than 5 min. for the same reasons and, in most cases, is complete in several minutes.

The fine alkali hydroxide suspension is transferred by quantitative solvent rinses (total 250 cc.) in the drybox to a dry, 1-liter resin kettle equipped with a stirrer, entrance and exit nitrogen flush connections, and a port for acetylenic alcohol addition. The sealed reactor is then removed from the drybox, purged with a slow current of dry nitrogen, and cooled with moderate stirring from 0° to −10°. Anhydrous conditions are maintained in all operations using nitrogen dried over potassium hydroxide pellets.

The acetylenic alcohol, e.g. methylbutynol, dissolved in the selected anhydrous solvent is added during 5–10 min. to the hydroxide-solvent slurry, and stirred rapidly enough to obtain good mixing, but slow enough to avoid excessive spattering. Within 5 min. the reaction slurry changes from a thin, readily stirrable slurry to a thick, white barely stirrable mass. The reaction temperature is maintained at −10 to 0° to avoid any conversion to the dimethylhexyndiol-base adduct. After stirring 30 min. to 2 hr. the reaction is complete and gives conversions of 98–100% depending on the water content of the base.

The adduct is isolated either by suction filtration in the drybox or by centrifugation (basket centrifuge) in sealed tubes. After several washings (anhydrous conditions) with dry, low boiling petroleum ether, the moist filter cake is vacuum dried (1 mm.) to constant weight during 6–8 hr. The dry material is powdered, and stored in sealed jars in an icebox desiccator (1 l. resin kettle) over sodium hydroxide pellets.

Although potassium hydroxide containing as high as 10% water, and coarser (40 mesh) in particle size can be used, conversions to the adducts are considerably lower (as much as 50%) and more variable.

Thus, 3-methyl-1-butyn-3-oil-potassium hydroxide adduct is prepared by the procedure described, using a 42 g. (0.50 mole) sample of methylbutynol and 28.5 g. (0.50 mole) of 98% potassium hydroxide in 800 cc. of diisopropyl ether, to give 69.8 g. (99.7% conversion) of adduct. Another desirable reaction loading is 0.20 mole of alkali hydroxide and methylbutynol per 500 cc. of solvent. Concentrations of methylbutynol and potassium hydroxide of 0.5 mole/500 c. can be employed successfully, but the reaction mixture becomes excessively thick and difficult to stir.

Calcd. (percent): KOH, 40.0; C≡CH, 17.9; C, 42.8; H, 6.4. Found (percent): KOH, 38.3; C≡CH, 17.5; C, 42.6; H, 7.8.

EXAMPLE 2

The method of preparation described in Example 1 is suitable for the preparation of acetylenic glycol adducts, such as 2,5-dimethyl-3-hexyn-2,5-diol-alkali metal hydroxide adducts, except that a higher reaction temperature (30–35°) is employed with solvents such as diisopropyl ether or toluene. For example, dimethylhexyndiol is dissolved by warming in 300–600 cc. of one of these solvents and then the mixture is added to a 300 cc. slurry of alkali hydroxide in the same solvent. The diol adducts yield a noticeably thicker reaction mass, and dilution with solvent is generally needed to facilitate isolation.

Thus, a 14.2 g. (0.10 mole) sample of dimethylhexyndiol and 5.7 g. (98%) of potassium hydroxide in 600 cc. of isopropyl ether gave 19.2 g. of adduct (97% conversion).

Calcd. (percent): KOH, 28.1; C≡C, 12.1; C, 48.4; H, 7.6. Found (percent): KOH, 27.7; C≡C, 11.1; C, 47.4; H, 8.2.

The average purity based on C and KOH values was 98.1%, and the ethynyl content (C≡CH) was less than 0.05%.

EXAMPLE 3

Following the procedure described in Example 1, an adduct of rubidium hydroxide and methyl butynol was prepared in diisopropyl ether (1.85 g. methyl butynol, 2.14 g. rubidium hydroxide, (85.3% RbOH, 14.7% $H_2O$) 25 cc. diisopropyl ether). The reaction represented 100% conversion to the adduct.

(Pure adduct) Calcd. (percent): RbOH, 55.0; methyl butynol, 45.0. Found (percent): RbOH, 45.0; methyl butynol, 38.6.

Rubidium hydroxide was also reacted with dimethylhexyndiol, as described in Example 2, to produce an adduct of rubidium hydroxide and dimethylhexyndiol in 76% conversion (2.08 g. dimethylhexyndiol, 1.50 g. rubidium hydroxide, 100 cc. diisopropyl ether).

(Pure adduct) Calcd. (percent): RbOH, 41.8; dimethyl hexyn diol, 58.2. Found (percent): RbOH, 37.9; dimethyl hexyn diol, 51.2.

EXAMPLE 4

Again following the procedure of Example 1, a cesium hydroxide methyl butynol adduct was prepared in 52% conversion using 1.43 g. methyl butynol, 2.25 g. cesium hydroxide (90.8%) and 25 cc. diisopropyl ether.

(Pure adduct) Calcd. (percent): CsOH, 61.3; methyl butynol, 38.7. Found (percent): CsOH, 61.2; methyl butynol, 25.0.

Cesium hydroxide was also reacted with dimethylhexyndiol in accordance with the procedure described in Example 2, using a reaction mixture composed of 1.52 g. dimethylhexyndiol, 1.60 g. cesium hydroxide (90.8%) and 200 cc. diisopropyl ether to give a 72% conversion to the adduct.

(Pure adduct) Calcd. (percent): CsOH, 51.4; dimethylhexyndiol, 48.6. Found (percent): CsOH, 52.2; dimethylhexyndiol, 42.6.

The above described adducts of rubidium hydroxide and cesium hydroxide are also readily prepared in liquid ammonia.

EXAMPLE 5

As mentioned above, the successful preparation of adducts with sodium hydroxide requires the use of liquid ammonia as the reaction medium. Thus a sodium hydroxide-methyl butynol adduct was prepared using a reaction charge composed of 400 cc. liquid ammonia, 12.4 g. 97% powdered NaOH (0.30 mole 100% basis), and 26.9 g. methyl butynol (0.32 mole). The reaction temperature was 22–25° C. and the reaction was carried out for 2 hours at a reaction pressure of 150 p.s.i.g.

The weight of the dry crystalline adduct was 24 g. (dried to constant weight at 1 mm. and room temp.).

The adduct was crystalline, and fluffy compared to the original powdered sodium hydroxide used. Its bulk density was considerably lower than that of sodium hydroxide.

Percent conversion based on weight increase and a 97% sodium hydroxide used is 63%.

Potassium hydroxide, as illustrative of the abovementioned alkali-metal hydroxides, has also been observed qualitatively to form crystalline adducts with other tertiary acetylenic carbinols and glycols. Very rapid (less than one minute) formation of thick reaction slurries of adducts, at room temperature, were observed with 1-ethynylcyclohexanol and 3-methyl-1-pentyn-3-ol, while diols such as 3,6-diethyl-4-octyn-3,6-diol, 4,7-dimethyl-5-decyn-4,7-diol, and bis-1-(1-hydroxycyclohexyl)acetylene gave moderately rapid reactions as evidenced by the formation of crystalline slurries in ten to fifteen minutes. 3-phenyl-1-butyn-3-ol showed only slight evidence of reaction during a fifteen-minute period, but on overnight shaking formed a moderately thick slurry.

The X-ray diffraction patterns of adducts of potassium hydroxide and methylbutynol (III) and of potassium hydroxide and of dimethylhexyndiol (IV), determined in sealed capillaries, are essentially identical, it being somewhat difficult to distinguish them. A characteristic intense d. spacing at 11.5–12.5 A. is present in both III and IV. As high as twenty less intense spacings have been observed at 2–13.7 A. Free potassium hydroxide is minor or absent as estimated by characteristics d. spacings at 4.00, 3.70, 2.93, 2.68, 2.58, 2.43, 2.30, 1.98, 1.84, 1.64, 1.55 A.

The infrared spectra (potassium bromide disk or Nujol mull) of freshly prepared adduct of compound I show the absence of the characteristic C≡C stretch at 4.68–4.76μ. Further, no strong absorption at 2.96–3.08μ typical of ≡CH is noted. In place of the chararcteristic —OH absorption of 3-methyl-1-butyn-3-ol at 3.00–3.07μ, a broad, weak band at approximately 3.0–4.0μ is observed in adduct III. The typical C—O stretch for tertiary acetylenic carbinols and glycols at 8.7μ is still detectable in the adducts.

The dimethylhexyndiol-potassium hydroxide adduct yields an infrared spectra similar to the parent compound except for the absence of the normal —OH maxima at 3.0μ. In its place is noted a fairly strong absorption at 4.0μ which resembles that found in chelated or hydrogen bonded groups. The typical C—O stretch also is observed at 8.7μ, but no C≡C is detected (or expected) at about 4.7μ since the internal triple bond is generally infrared inactive.

The infrared spectrum of freshly prepared adduct of compound I is observed on pressing (potassium bromide disk) to undergo slight changes compared to spectra run in Nujol. Similar changes also are noted and are much more pronounced after this adduct has stood at room temperature for periods longer than one week. These spectra changes are due to the gradual conversion of this adduct into the adduct of compound II, or possible decomposition of the adduct into acetone and acetylene due to the heat of pressing. Adduct IV does not show comparable changes in spectrum under similar conditions.

The complete absence of C≡C and ≡CH stretches in the adduct of compound I together with a possible weak, broad hydroxyl group absorption indicates interaction of potassium hydroxide with both the cylindrical τ shell of the triple bond and the tertiary —OH group. Such bonding is suggestive of complex formation rather than the alternate possibility of an alkoxide containing a tightly bound molecule of water. The essentially quantitative conversions observed in the formation of KOH adducts and of compounds I and II under mild temperature conditions is not typical of the known inertness of teritary alcohols with alkali hydroxides to form alkoxides.

EXAMPLE 6

This example illustrates the preparation of an acetylenic carbinol from acetylene and a carbonyl compound using as catalyst an adduct of an acetylenic alcohol and an alkali metal hydroxide such as prepared in the foregoing examples.

Into a one-liter stirred autoclave there was introduced the following reaction charge: 0.10 moles methyl butynol-KOH adduct, 1.2 moles acetone, 1.6 moles acetylene, and 200 cc. liquid ammonia, the ammonia, acetylene and adduct being first introduced, and the acetone being gradually added to the system. The total reaction time was one and a half hours at 30–32° using half hour addition time for introducing acetone into the reaction mixture. The total pressure in the autoclave averaged 160–185 p.s.i.g.

Isolation was effected by venting the ammonia and acetylene directly to the atmosphere. During the venting about 500 cc. of a replacement solvent, diisopropyl ether was gradually added over a period of 15–30 min. When the autoclave temperature again reached 25–35° (cooling effect due to ammonia evaporation), the vapor space was purged with two 100 p.s.i.g. nitrogen chasers, and the reactor then cooled to 0–5°.

Dry carbon dioxide gas was then added to the autoclave to a pressure of 200 p.s.i.g. and this pressure maintained for 10 min. with good stirring. The excess carbon dioxide was then vented and the autoclave contents removed. The resulting mixture of ethynylcarbinol, solvent, a minor amount of unchanged carbonyl compound, and ammonium (small) and potassium bicarbonates was filtered to remove inorganic salts which were washed with solvent. The combined organic phase was fractionally distilled through a column of about 15–20 theoretical plates.

The total conversion to methyl butynol before distillation was 97%, and the catalytic conversion (moles of methyl butynol per mole KOH) was 1,170%. The conversion to pure methyl butynol was 88% (88 g.), B.P. 103–104° C.

EXAMPLE 7

The procedure described in Example 6 was repeated, using the same amounts of liquid ammonia acetone and acetylene but using 0.05 mole of the sodium hydroxide-methyl butynol adduct prepared in Example 4 and using a total reaction time of 3 hours and a pressure of 195–215 p.s.i.g. The conversion to methyl butynol after distillation was 78.5% (78.4 g.) and the catalytic conversion (moles of methyl butynol per mole of adduct) was 1131%.

EXAMPLE 8

This example shows the preparation of an acetylenic alcohol using as catalyst an acetylenic glycol-alkali metal adduct. Using the reaction vessel described in the foregoing examples, and the reaction conditions described in Example 5, methyl butynol was prepared from a reaction mixture composed of 1.2 moles of acetone, 1.1 moles acetylene, 200 cc. liquid ammonia and 0.07 mole of the adduct described in Example 2. After isolation of the product, as described in Example 6, the methyl butynol was recovered in an amount representing a conversion of 81% based on the acetone and a catalytic conversion based on the adduct of 1370%.

EXAMPLE 9

An adduct of rubidium hydroxide and methyl butynol, such as described in Example 3, also employed as catalyst for the synthesis methyl butynol from acetone and acetylene in liquid ammonia was used with 1.2 mole of acetone, 1.6 mole of acetylene and 200 cc. of liquid ammonia, the catalyst corresponding to 0.0506 mole of rubidium hydroxide. The reaction temperature was 30° to 36° C. at a pressure of 243–265 p.s.i.g., and the reaction was carried out for 3 hours. The recovered product methyl butynol represented a conversion based on acetone of 84% and a conversion based on the adduct of 1970%. In like manner, an adduct of rubidium hydroxide and an acetylenic glycol will serve as catalyst for the formation of acetylenic carbinol when such an adduct is substituted for the potassium hydroxide adduct of Example 9, and acetylenic alcohol adducts of cesium hydroxide will give corresponding results.

It will be understood that various changes and modifications may be made in the foregoing description without parting from the scope of the invention, as defined in the appended claims and it is intended, therefore, that all matter contained in the foregoing description shall be interpreted as illustrative only and not as limitative of the invention.

What is claimed is:

1. A method for producing an adduct of an acetylenic alcohol and an alkali metal hydroxide selected from the group consisting of sodium hydroxide, potassium hydroxide, cesium hydroxide and rubidium hydroxide, effective as a catalyst for the ethynylation of carbonyl compounds to form acetylenic alcohols, which comprises bringing said alkali metal hydroxide, essentially anhydrous and finely divided into contact with said acetylenic alcohol in a solvent selected from the group consisting of a lower alkyl ether, dioxane, methylal, ethylenediamine, dimethyl sulfoxide, toluene, and liquid ammonia, and separating the adduct from the solvent by filtration or centrifuging to obtain a product selected from the group consisting of essentially pure adduct and an admixture of alkali metal hydroxide and at least about 50% adduct, said acetylenic alcohol selected from the group corresponding to the acetylenic carbinols and glycols produced by adding acetylene to a ketone of the formula

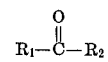

wherein $R_1$ and $R_2$ may be the same or different radicals selected from the group consisting of alkyl of 1 to 20 carbon atoms, and aryl of 6 to 12 carbon atoms, and where taken together alkylene of 6 to 12 carbon atoms.

2. A method as defined in claim 1, wherein said acetylenic alcohol is an acetylenic carbinol selected from the group consisting of 3-methyl-1-butyn-3-ol, 3-methyl-1-pentyn-3-ol, 1-ethynylcyclohexanol and 3-phenyl-1-butyn-3-ol.

3. A method for producing an adduct of an acetylenic alcohol and an alkali metal hydroxide selected from the group consisting of sodium hydroxide, potassium hydroxide, cesium hydroxide and rubidium hydroxide, effective as a catalyst for the ethynylation of carbonyl compounds to form acetylenic alcohols, which comprises bringing said alkali metal hydroxide, essentially anhydrous and finely divided into contact with said acetylenic alcohol in a solvent selected from the group consisting of a lower alkyl ether, dioxane, methylal, ethylenediamine, dimethyl sulfoxide, toluene, and liquid ammonia, and separating the adduct from the solvent to obtain a product selected from the group consisting of essentially pure adduct and an admixture of alkali metal hydroxide and at least about 50% adduct, said acetylenic alcohol being an acetylenic glycol selected from the group consisting of 2,5-dimethyl-3-hexyn-2,5-diol, 3,6 - diethyl-4-octyn-3,6-diol, 4,7 - dimethyl-5-decyn-4,7-diol and bis-1-(1-hydroxycyclohexyl)-acetylene.

4. A method for producing an adduct of an acetylenic alcohol and an alkali metal hydroxide selected from the group consisting of sodium hydroxide, potassium hydroxide, cesium hydroxide and rubidium hydroxide, effective as a catalyst for the ethynylation of carbonyl compounds to form acetylenic alcohols, which comprises bringing said alkali metal hydroxide, essentially anhydrous and finely divided, into contact with said acetylenic alcohol in a solvent selected from the group consisting of a lower alkyl ether, dioxane, methylal, ethylenediamine, dimethyl sulfoxide, toluene, and liquid ammonia, and separating the adduct from the solvent to obtain a product selected from the group consisting of essentially pure adduct and an admixture of alkali metal hydroxide and at least about 50% adduct, said acetylenic alcohol selected from the group corresponding to the acetylenic carbinols and glycols produced by adding acetylene to a ketone of the formula $$R_1-\overset{O}{\underset{\|}{C}}-R_2$$

wherein $R_1$ and $R_2$ may be the same or different radicals selected from the group consisting of alkyl of 1 to 20 carbon atoms, and aryl of 6 to 12 carbon atoms, and where taken together alkylene of 6 to 12 carbon atoms, wherein said ether is selected from the group consisting of diisopropyl ether and dioxane.

5. A method as defined in claim 1, wherein said solvent is liquid ammonia.

6. A method as defined in claim 1, wherein said acetylenic alcohol is 3-methyl-1-butyn-3-ol.

7. A method as defined in claim 1, wherein said acetylenic alcohol is 2,5-dimethyl-3-hexyn-2,5-diol.

8. A method as defined in claim 1, wherein the alkali metal hydroxide is potassium hydroxide.

9. A method as defined in claim 1, wherein said alkali metal hydroxide is sodium hydroxide and said solvent is liquid ammonia.

References Cited

UNITED STATES PATENTS

| | | | |
|---|---|---|---|
| 2,125,384 | 8/1938 | Macullum | 260—638 X |
| 2,163,720 | 6/1939 | Vaughn | 260—638 X |
| 2,455,058 | 11/1948 | Herman | 260—638 X |
| 2,996,552 | 8/1961 | Blumenthal | 260—638 X |
| 3,082,260 | 3/1963 | Tedeschi et al. | 260—638 X |

OTHER REFERENCES

Tedesch. et al., "J. Org. Chem.," vol. 28 (1963), pp. 2480 to 2483.

LEON ZITVER, Primary Examiner

J. E. EVANS, Assistant Examiner

U.S. Cl. X.R.

260—611 R, 615 R, 617 E, 618 E, 631 R, 635 Y, 638 Y

UNITED STATES PATENT OFFICE
CERTIFICATE OF CORRECTION

Patent No. 3,663,628　　　　　　　　　Dated May 16, 1972

Inventor(s) Robert J. Tedeschi

It is certified that error appears in the above-identified patent and that said Letters Patent are hereby corrected as shown below:

Column 3, line 4, "$(C_3H_7-O-C_5H_8)$" should read -- $(C_3H_7-O-C_5H_8)$ --. Column 5, line 69, "quantitative" should read -- equantitative --. Column 6, line 66, "0.5 mole/500c." should read -- 0.5 mole/500cc --.
　　　Signed and sealed this 27th day of February 1973.

(SEAL)
Attest:

EDWARD M. FLETCHER, JR.　　　　　　　　ROBERT GOTTSCHALK
Attesting Officer　　　　　　　　　　　Commissioner of Patents